No. 780,453. PATENTED JAN. 17, 1905.
C. H. STRUEBE.
AGRICULTURAL TOOL.
APPLICATION FILED SEPT. 10, 1904.
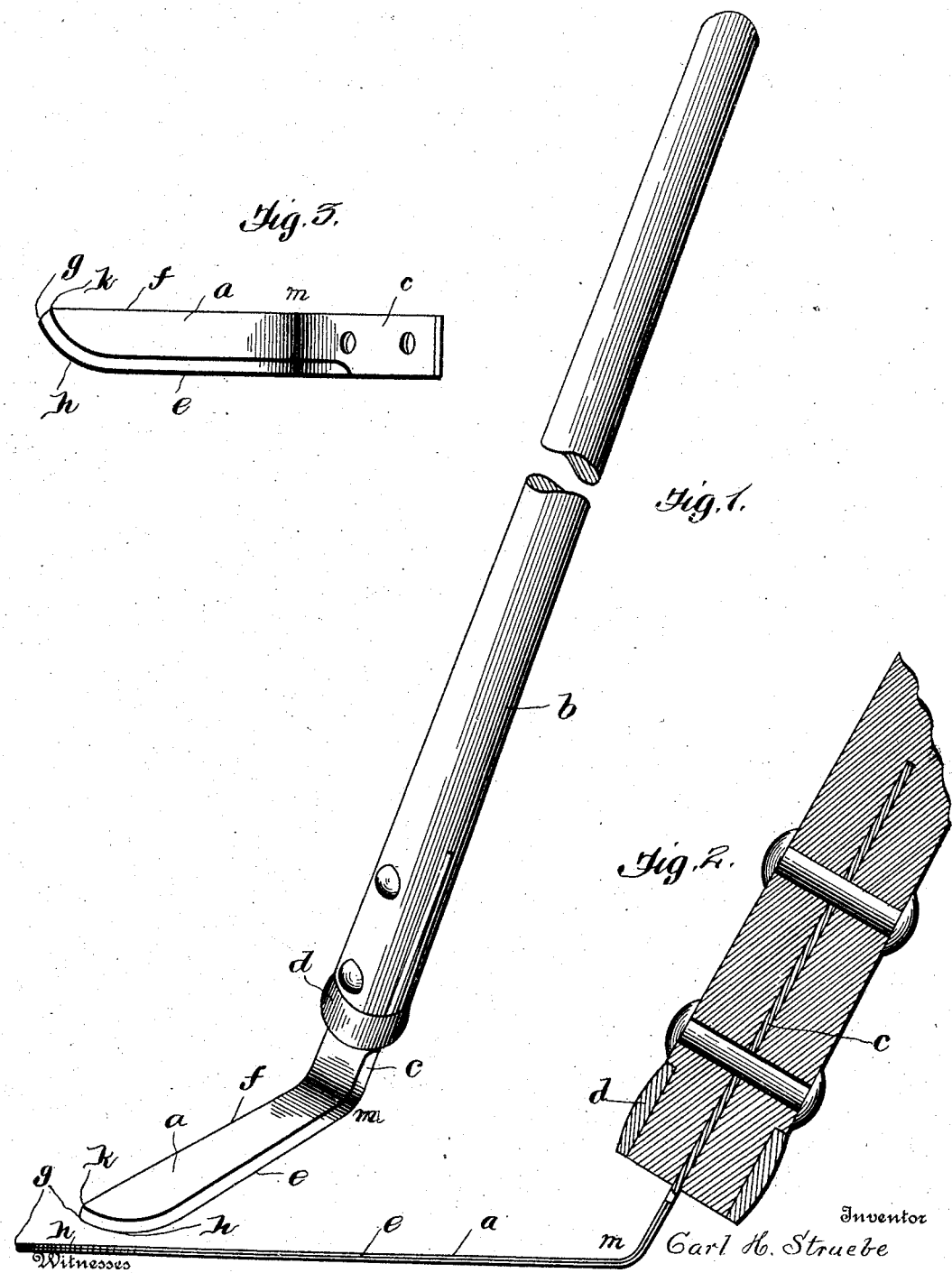
Inventor
Carl H. Struebe
By E. W. Anderson
his Attorney
Witnesses
P. A. Biswell
A. G. Gedney No. 780,453.

Patented January 17, 1905.

UNITED STATES PATENT OFFICE.

CARL H. STRUEBE, OF SANDUSKY, OHIO.

AGRICULTURAL TOOL.

SPECIFICATION forming part of Letters Patent No. 780,453, dated January 17, 1905.

Application filed September 10, 1904. Serial No. 223,999.

*To all whom it may concern:*

Be it known that I, CARL H. STRUEBE, a citizen of the United States, and a resident of Sandusky, in the county of Erie and State of Ohio, have made a certain new and useful Invention in Agricultural Tools; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of the tool, Fig. 2 is a partial sectional view showing an edge view of the blade. Fig. 3 is a top view of the blade.

The invention relates to agricultural tools; and it consists in the novel construction and combinations of parts, as hereinafter set forth.

The object of the invention is to provide a simple and convenient tool which is much lighter than a hoe or spade and is operated in a different manner and with great ease in difficult work, and especially in weeding in the garden and field.

In the accompanying drawings, illustrating the invention, the letter $a$ designates the blade of the tool, and $b$ the handle. The main portion of the blade is straight and about four inches long, more or less, and about an inch wide for the most convenient size. It is bent flatwise at $m$ to provide a tang or holding portion $c$, which is inclined at an angle of about one hundred and twenty degrees to the plane of the blade and is designed to be secured to the handle by means of a collar or ferrule, so as to project axially from the end thereof, as indicated at $d$. When thus secured, the tang or root portion of the blade projects axially from the end of the handle and the main portion of the blade sets forward at a high angle to the end thereof, as hereinbefore indicated, and the angular bend where the root portion joins the main portion in flatwise of the blade, or so that the plane of the blade cuts the radial plane of the handle passing through it at a right angle, or nearly so. The blade has two lateral edges and a point portion. The edges extend in parallel fashion along the root portion and main portion to the point portion, and while one of the edges, $e$, is sharp the other edge, $f$, is dull and forms the back of the blade. One of these parallel edges is usually rounded in convex form at the point portion to the extremity or point $g$, this convex edge $h$ extending nearly the breadth of the blade and meeting at the point $g$ the oblique end $k$ of the other edge in such wise as to form a strong point having the character of a right angle, so that it is not apt to be injured by rough usage in the soil. The angular flatwise relation of the main portion of the blade to the axis of the handle facilitates its use not only laterally in a mowing fashion, the blade being held in a manner parallel to the ground, but also vertically in a digging way, wherein it also has a tendency to work laterally through the automatic wedging action of its point and back edge. The blade can also be worked at an angle to cut obliquely downward or obliquely upward, and is therefore designed to serve most useful purposes in cutting out weeds and weed-roots and in garden-work, especially in confined places and between delicate plants. The radial and oblique position of the blade with reference to the end of the handle is such as to cause the blade when rotated or moved laterally with a swinging action to move in a conical path, which is forward or away from the operator, whereby the soil and weeds are thrown aside and away from the operator, so that his feet are not soiled and he has a clear weeding-space. The extension of the cutting edge at the bend of the blade from the main portion along the root portion to the handle end provides a cutting angle or bend which materially facilitates the use of the tool.

Having described the invention, what I claim, and desire to secure by Letters Patent, is—

A weeding-tool consisting of a handle and a flatwise-bent laterally-sharpened blade, having a root portion projecting in the line of the handle, and a forward-inclined straight plane portion extending from said root portion at right angles to the radial plane of the handle and having a cutting-point portion rounded at its edge, and a back edge meeting said rounded edge in a strong point, substantially as specified.

In testimony whereof I affix my signature in presence of two witnesses.

CARL H. STRUEBE.

Witnesses:
  C. E. BOUTON,
  CHARLES DICK.